United States Patent
Yoshikawa et al.

(10) Patent No.: US 6,815,097 B2
(45) Date of Patent: Nov. 9, 2004

(54) MAGNETIC RECORDING MEDIUM

(75) Inventors: Toshihiko Yoshikawa, Chiba (JP); Akira Sakawaki, Chiba (JP); Hiroshi Sakai, Chiba (JP)

(73) Assignee: Showa Denko K.K., Tokyo (JP)

( * ) Notice: Subject to any disclaimer, the term of this patent is extended or adjusted under 35 U.S.C. 154(b) by 46 days.

(21) Appl. No.: 10/078,659

(22) Filed: Feb. 21, 2002

(65) Prior Publication Data

US 2002/0160230 A1 Oct. 31, 2002

Related U.S. Application Data (63) Continuation-in-part of application No. 09/493,037, filed on Jan. 28, 2000, now abandoned.
(60) Provisional application No. 60/121,691, filed on Feb. 25, 1999.

(30) Foreign Application Priority Data

Jan. 29, 1999 (JP) ............................................. 11-023256

(51) Int. Cl.⁷ ................................ G11B 5/66; G11B 5/70
(52) U.S. Cl. ........................ 428/694 TM; 428/694 TS; 428/336; 428/900
(58) Field of Search .................... 428/694 TS, 694 TM, 428/336, 900

(56) References Cited

U.S. PATENT DOCUMENTS

| | | | |
|---|---|---|---|
| 5,041,922 A | * | 8/1991 | Wood et al. .................... 360/55 |
| 5,576,085 A | | 11/1996 | Lal et al. |
| 5,738,945 A | | 4/1998 | Lal et al. |
| 5,750,270 A | | 5/1998 | Tang et al. |
| 5,861,220 A | | 1/1999 | Coughlin et al. |
| 6,156,422 A | * | 12/2000 | Wu et al. ..................... 428/332 |
| 6,194,058 B1 | | 2/2001 | Isobe et al. |
| 6,592,976 B2 | * | 7/2003 | Futamoto et al. ............ 428/212 |

FOREIGN PATENT DOCUMENTS

WO    WO 93/12928    7/1993

\* cited by examiner

*Primary Examiner*—Holly Rickman
(74) *Attorney, Agent, or Firm*—Sughrue Mion, PLLC (57) ABSTRACT

A magnetic recording medium comprising a non-magnetic substrate having thereon a non-magnetic underlayer, a magnetic recording layer, a soft magnetic layer and a protective layer, wherein the coercivity is 2,500 Oe or more and the thickness of the soft magnetic layer is from 5 to 50 Å.

11 Claims, 2 Drawing Sheets

MAGNETIC RECORDING MEDIUM

CROSS REFERENCE TO RELATED APPLICATIONS

This application is a Continuation-in-Part of application Ser. No. 09/493,037 filed Jan. 28, 2000, now abandoned, claiming benefit pursuant to 35 U.S.C. § 119(e) (i) of the filing date of the Provisional Application 60/121,691 filed Feb. 25, 1999 pursuant to 35 U.S.C. §111(b).

FIELD OF THE INVENTION

The present invention relates to a magnetic recording medium for use in a magnetic disk apparatus and the like. More specifically, the present invention relates to a magnetic recording medium having excellent properties when it is used with a head employing a reproducing device making use of a magnetoresistive effect, represented by an inductive-MR composite head.

BACKGROUND OF THE INVENTION

A magnetic disk apparatus or the like has been recently designed to have a higher recording density. To keep up with this tendency, improvement in the signal-to-noise ratio (hereinafter referred to as "SNR") is required and further the isolated waveform half width (hereinafter referred to as "PW50") needs to be reduced.

In order to attain higher SNR and narrower PW50, increase of coercivity is effective, and for increasing coercivity, use of a material having a higher Ku for the magnetic recording layer is effective. The technique of attaining higher coercivity due to the increase of Ku can also be an effective means for solving the problem of thermal decay standing out in recent years, that is, a problem such that signals once recorded decrease with the passage of time.

If the coercivity (Hc) is elevated so as to improve SNR and PW50, however, problems may arise, for example, the signals once recorded are not deleted even if those signals are overwritten (deterioration in overwrite (hereinafter referred to as "OW") property) or signals cannot be written in the track edge area (deterioration in off-track property).

For solving these problems, an inductive-MR composite head obtained by compounding an inductive head optimized for writing and a head employing a reproducing device making use of a magnetoresistive effect and thereby having improved reading sensitivity is used.

On the other hand, a technique of providing a soft magnetic layer, so-called keeper layer, on a magnetic recording medium has been recently used with an attempt to improve the electromagnetic property or thermal decay. Examples of magnetic recording media having a soft magnetic layer include those disclosed in B. Gooch, R. Niedermeyer, R. Wood and R. Pisharody, *IEEE Transactions on Magnetics*, Vol. 27, No. 6, p. 4549 (1991), JP-A-7-169037 (the term "JP-A" as used herein means an "unexamined published Japanese patent application") and JP-A-10-116412.

The magnetic recording medium disclosed in Gooch et al. is disadvantageous in that unless a bias flux for saturating the soft magnetic layer is added from the writing core of the inductive head when the recorded data is reproduced, a leakage flux is not induced from the medium surface and good reproducing signals cannot be obtained.

For this reason, the magnetic recording medium disclosed in Gooch et al. cannot be used with an inductive-MR composite head described above which is widely used at present.

The magnetic recording medium disclosed in JP-A-7-169037 is designed to cope with a reading-writing head of a bias current 0 (for example, inductive head) and difficulties in attaining high recording density and reduction in the noise arise.

Under the current circumstances requiring higher recording density, a method of using an inductive head or a method incapable of using a reading device making use of magnetoresistive effect, such as MR or GMR head, in the reproduction is not practical any more.

More specifically, use of an inductive head or the like approaches a limit in view of the reduction of noise and the increase of recording density and the limit cannot be overcome. However, when a head making use of magnetoresistive effect as represented by MR and GMR is used, the isolated waveform output is as high as, for example, from 3 to 10 times that of the inductive head, so that the magnetic recording film can be made thin and thereby low noise and high recording density can be achieved.

The magnetic recording medium disclosed in JP-A-10-116412 is stated to be usable with a commercially available inductive-MR composite head. However, in the case of high-coercivity magnetic recording medium for high-density recording now in wide use where a soft magnetic layer having a permeability as low as about 100 to 1,000 is used, the recording properties cannot be improved and electromagnetic properties cannot be satisfied either.

In the case of conventional magnetic recording media without a no soft magnetic layer, Ni and the like in the NiP layer on the surface of a non-magnetic substrate diffuses from the surface of the magnetic recording medium through defects such as scratches or pits and results in corrosion in some cases.

SUMMARY OF THE INVENTION

The present invention has been made under these circumstances and an object of the present invention is to provide a magnetic recording medium capable of increasing SNR and PW50 without causing any deterioration in the OW property and the off-track property and moreover, favored with a sufficiently high corrosion resistance.

The above-described object is attained by a magnetic recording medium comprising a non-magnetic substrate having thereon a non-magnetic underlayer, a magnetic recording layer, a soft magnetic layer and a protective layer, wherein the coercivity is 2,500 Oe or more and the thickness of the soft magnetic layer is from 5 to 50 Å.

DESCRIPTION OF THE PREFERRED EMBODIMENTS

In the magnetic recording medium of the present invention, the amount of extracted Ni can be 0.08 $ng/cm^2$ or less per the unit area of the substrate.

The soft magnetic layer preferably has a maximum permeability of from 1,000 to 1,000,000.

Furthermore, in the present invention, a non-magnetic intermediate layer may be provided immediately under the magnetic recording layer.

The magnetic recording medium of the present invention can be used with a head employing a reproducing device making use of a magnetoresistive effect.

Figure 1:
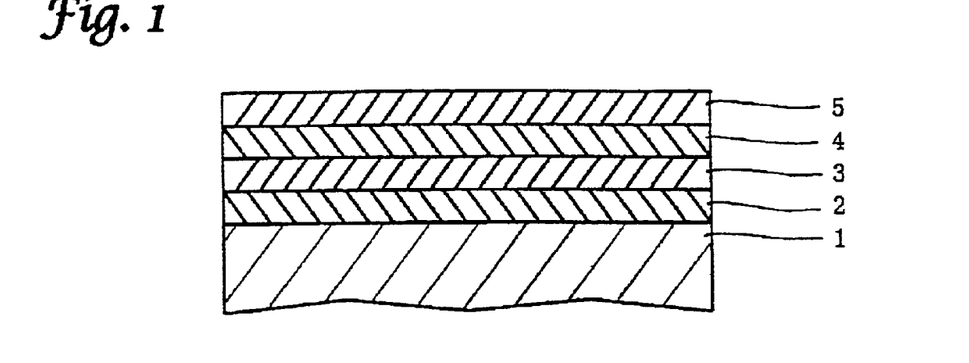
FIG. 1 is a partial cross section showing one practical embodiment of the magnetic recording medium of the present invention.

FIG. 1 is a view showing one practical embodiment of the magnetic recording medium of the present invention. The magnetic recording medium shown here comprises a non-magnetic substrate 1 having provided thereon in sequence a non-magnetic underlayer 2, a magnetic recording layer 3, a soft magnetic layer 4 and a protective layer 5.

For the non-magnetic substrate 1, those commonly used as a substrate of magnetic recording media may be used, such as an aluminum alloy substrate having formed thereon an NiP plating film (hereinafter referred to as "NiP-plated Al substrate"), a glass substrate, a ceramic substrate, a flexible resin substrate and a substrate obtained by depositing NiP on the substrate described above by plating or sputtering.

The surface of the substrate 1 may be textured for the purpose of obtaining good electromagnetic properties, imparting in-plain magnetic anisotropy and thereby improving thermal fluctuating property, or erasing traces of polishing.

For the non-magnetic underlayer 2, a conventionally known non-magnetic underlayer, for example, a single composition film of Cr, Ti, Ni, Si, Ta or W, or a film formed of an alloy obtained by adding other elements to the metal in the range not impairing crystallinity may be used.

In particular, when a material containing Cr (single composition) or containing Cr and one or more selected from Mo, W, V, Ti and Nb is used, the magnetic recording layer 3 may have advantageously good crystal orientation. In the case of using such a material, the composition is preferably represented by $Cr_zY$, wherein Y is one or more selected from Mo, W, V, Ti and Nb. The Y content (z) is preferably 30 at % or less. If the Y content exceeds 30 at %, the coercivity and noise property of the magnetic recording layer 3 may deteriorate.

The thickness of the non-magnetic underlayer 2 is not particularly limited so long as a predetermined coercivity can be obtained. The thickness is preferably from 50 to 400 Å, more preferably from 100 to 300 Å.

If the thickness of the underlayer 2 is less than 50 Å, the magnetic recording layer 3 (or non-magnetic intermediate layer) formed on the underlayer 2 is deteriorated in crystal orientation and then, SNR decreases.

On the other hand, if the thickness exceeds 400 Å, the crystal grain size increases in the underlayer and the crystal grain size also increases in the magnetic recording layer 3 (or non-magnetic intermediate layer) on the underlayer 2. As a result, SNR decreases.

The non-magnetic underlayer 2 may comprise a single layer or may comprise a multi-layer structure. In the case of a multi-layer structure, the plurality of layers stacked may be the same or different in composition. When at least one of the multiple layers comprises NiAl, SNR may be remarkably improved in some cases. Also, when the non-magnetic underlayer comprises a NiAl single layer, SNR may be remarkably improved in some cases.

The magnetic recording layer 3 is not particularly limited so long as a predetermined coercivity (described hereinafter) can be obtained, however, the layer preferably comprises a Co alloy represented by: $aCobCrcPtdTaeZrfCugNi$ (wherein b is from 16 to 25 at %, c is 10 at % or less, d is from 1 to 7 at %, e is 4 at % or less, f is 3 at % or less, g is 10 at % or less and a is the balance), so that the Ku can be elevated.

Respective components are more preferably present in such a proportion that b is from 16 to 22 at %, c is from 6 to 10 at %, d is from 1 to 3 at %, e is 2 at % or less, f is 2 at % or less and g is 8 at % or less.

In the case where a head used for recording of higher density for example, a head including a write pole made of a material having a saturated magnetic flux density (Bs) of 2T or more is used, c is preferably 20 at % or less (more preferably 6 to 20 at %) for attaining good electromagnetic conversion properties.

By using a material containing at least one of Zr, Cu and Ni, the coercivity and SNR can be advantageously increased.

The Cr content (b) is preferably from 16 to 25 at %, because if the Cr content is less than 16 at %, the Co-containing magnetic particles disperse unsatisfactorily due to segregation of Cr and the magnetic coupling between magnetic particles readily causes reduction in the noise property, whereas if it exceeds 25 at %, a predetermined coercivity is difficultly obtained.

When the magnetic recording medium of the present invention is used for high density recording of 15 Gbpsi (giga bit per square inch) or more, preferably, the magnetic recording layer has a multi-layered structure in which average Cr content of the layer as a whole falls within the range of 16 to 25 at %. For example, in one preferred embodiment, the magnetic recording layer includes two sub-layers, with one layer being Cr-rich and the other layer containing comparatively less Cr. In this case, preferably, the Cr contents in respective sub-layers that constitute the magnetic recording layer fall within the range of 8 to 26 at %.

The Pt content (c) is preferably 10% or less, because if the Pt content exceeds 10 at %, the SN ratio deteriorates.

As described above, in the case where a head for use with higher recording density is used, c is preferably 20 at % or less, because recording is satisfactory up to 20 at %, and thus good electromagnetic conversion properties can be obtained at high recording density.

The Ta content (d) is preferably from 1 to 7 wt %, because if the Ta content is less than 1 at %, the noise is liable to increase, whereas if it exceeds 7 at %, a high coercivity is difficultly obtained.

The Zr content (e) is preferably 4 at % or less, because if the Zr content exceeds 4 at %, the SNR deteriorates.

The Cu content (f) is preferably 3 at % or less, because if the Cu content exceeds 3 at %, the SNR deteriorates.

The Ni content (g) is preferably 10 at % or less, because if the Ni content exceeds 10 at %, the SNR deteriorates.

Another example magnetic recording layer 3 is formed of a Co alloy having a formula $aCobCrcPtdTaeZrfCuhBjRu$ (wherein b is from 8 to 26 at %, c is 20 at % or less, d is 7 at % or less, e is 4 at % or less, f is 3 at % or less, h is from 1 to 20 at %, j is 20 at % or less, and a is the balance). Use of a B-containing material is preferred, because higher SNR can be obtained. B is considered to contribute to reduction in size of particles contained in the magnetic layer and also to enhancement of the effect of magnetic separation of particles contained therein, due to segregation of Cr. The amount of B to be added is preferably between 1 at % and 20 at %, inclusive. When the amount of B is in excess of 20 at %, magnetization of the magnetic layer(s) becomes weak, calling for a thicker magnetic layer for attaining a sufficient reproduction output, which deteriorates resolution (PW50).

Ru is empirically known to improve SNR, and therefore, more preferably, Ru is contained in addition to Cr. Although the role of Ru is not clearly elucidated, in view that enhanced SNR is attained by the addition of Ru, Ru is considered to contribute to reduction in size of the particles in magnetic layer(s) and/or to enhancement of the effect of magnetic separation of particles contained therein, due to segregation of Cr. The amount of Ru to be added is preferably 20 at % or less.

The thickness of the magnetic recording layer 3 is not particularly limited, but it is preferably from 150 to 400 Å, more preferably from 250 to 400 Å. If this thickness is less than 150 Å, good SNR and appropriate reproducing output may not be obtained, whereas if it exceeds 400 Å, SNR decreases.

Among magnetic recording media having an areal recording density of 15 Gbpsi or more, preferred are those having small thickness of magnetic layer with crystals contained grown as intact as possible. That is, as a result of thinning the magnetic layer, deterioration of SNR is no longer observed, but instead, crystal grain size is reduced, to thereby attain higher SNR. Preferably, the thickness of the magnetic recording film (i.e., magnetic layer(s)) is 100 to 300 Å.

The coercivity of the magnetic recording layer 3 is 2,500 Oe or more, for example, from 2,500 to 6,000 Oe. If the coercivity is less than 2,500 Oe, the bit-to-bit transition region expands, and as a result, the PW50 deteriorates, noise increases and the SNR decreases. Under the present circumstance, it is difficult to form a magnetic recording layer having a coercivity in excess of 6,000 Oe for magnetic recording media.

In the case of using a head capable of fully writing signals, the higher the coercivity of the magnetic recording layer 3, the more preferred. The coercivity is preferably 3,000 Oe or more, more preferably 3,500 Oe or more.

The soft magnetic layer 4 is not particularly limited but preferably comprises a single composition of Fe, Ni or Co or comprises an alloy containing other elements in addition to Fe, Ni or Co.

Specific examples of the material for the soft magnetic layer 4 include various alloys such as Ni—Fe, Ni—Fe—Mo, Ni—Fe—Cr, Ni—Fe—Si, Fe—C, Fe—Si, Fe—P, Fe—Al, Fe—Al—Si, Co—Cr, Ni—Cr, Fe—Cr—Ti, Fe—Cr—Cu, Fe—Co—V, Fe—Al—Si—Cr, Fe—Al—Si—Ti—Ru, Co—Zr—Nb, Co—Ta—Zr, Fe—Ta, Fe—Ta—C, Fe—Nb and Fe—Hf.

Of these, NiFe-system alloys (for example, permalloy) are preferred. Among the NiFe-system alloys, NiXFe is preferred. The Fe content x is suitably from 15 to 60 at %, preferably from 15 to 25 at %.

The NiFe-system alloy is preferably used because by using this material, improvement in corrosion resistance can be elevated and at the same time, good electromagnetic properties can be obtained.

The soft magnetic layer 4 suitably has a maximum permeability of from 1,000 to 1,000,000, preferably from 8,000 to 500,000, more preferably from 100,000 to 500,000.

If the maximum permeability is less than 1,000, insufficient writing on the magnetic recording medium may result at the recording and after the writing, the demagnetization field among transitions of magnetization may not be relaxed, as a result, satisfactory electromagnetic properties may not be obtained.

On the other hand, manufacture of a soft magnetic layer having a maximum permeability in excess of 1,000,000 is difficult in view of technology.

The maximum permeability is measured as follows. A test piece as a soft magnetic substance sputtering target is gradually magnetized from the absolutely not magnetized state by applying an external magnetic field using, for example, vibrating sample magnetometry (VSM), and the maximum in the ratio of the change of magnetization to the change of the magnetic field on a magnetization curve drawn until a state such that the intensity of magnetization does not increase any more even by increasing the magnetic field is reached, is defined as the maximum permeability. The permeability is a value shown in the CGS unit system.

The thickness of the soft magnetic layer 4 is from 5 to 50 Å, preferably from 5 to 30 Å, more preferably from 5 to 20 Å. If this thickness is less than 5 Å, the OW property and the off-track property are not satisfied, whereas if it exceeds 50 Å, the SNR decreases.

The thickness of the soft magnetic layer 4 may also be from 5 to less than 10 Å.

The above-described non-magnetic underlayer 2, magnetic recording layer 3 and soft magnetic layer 4 may be formed, for example, by sputtering.

The protective layer 5 is provided to prevent damages of the medium surface due to contacting with a head. The constructive material thereof may be a known material and, for example, a material comprising a single composition such as C, $SiO_2$ or $ZrO_2$, or a material mainly comprising such a composition and additionally containing other elements may be used.

The protective layer 5 may be formed using sputtering, ion beam method or plasma CVD method.

The thickness of the protective layer 5 may be from 1 to 20 nm but is preferably from 1 to 9 nm because the spacing loss can be more reduced.

A lubricating layer (not shown) may be formed on the surface of the protective layer 5, if desired. Examples of the material which can be used for the lubricating layer include fluoride-type liquid lubricants such as PFPE (perfluoropolyether), and solid lubricants such as fatty acids. The lubricating layer may be formed using a dipping method or spin coating method.

In the thus-manufactured magnetic recording medium, the amount of extracted Ni can be suppressed to 0.08 $ng/cm^2$ or less per unit area of the substrate due to the soft magnetic layer 4 formed therein.

The extracted Ni amount in excess of 0.08 $ng/cm^2$ is evaluated to reveal poor corrosion resistance and, for example, staining of the head disadvantageously occur.

The extracted Ni amount is determined in such a manner that the outer edge part and the inner edge part of a magnetic recording medium are each sealed by paraffin, the magnetic recording medium is then immersed in pure water at 80° C. for 30 minutes, and the amount of Ni dissolved out into the pure water per unit area of the substrate is measured and defined as the extracted Ni amount.

In the magnetic recording medium constructed as above, SNR and PW50 can be improved without deterioration in the OW property or off-track property occurring.

Furthermore, by providing a soft magnetic layer using a material having a corrosion potential more noble than that of NiP on the NiP layer, Ni in the NiP layer or light elements in the substrate material (e.g., glass, ceramic) is prevented from diffusing from the surface of the magnetic recording medium through defects such as scratches or pits and thereby the corrosion resistance can be improved.

The magnetic recording medium having the above-described structure has excellent properties particularly when it is used with a head employing a reproducing device making use of a magnetoresistive effect, represented by an inductive-MR composite head (hereinafter referred to as a "magnetoresistive effect-utilizing head"). While not desiring to be bound, this phenomenon is considered to occur because of the following reasons.

In the case where reproduction is performed from the above-described magnetic recording medium using a magnetoresistive effect-utilizing head, a part of the soft magnetic layer become saturated due to the bias flux produced by the head and the permeability of this part becomes lower than the permeability of the atmosphere, therefore, leakage flux exits outside the soft magnetic layer. As a result, a sharp magnetic circuit is formed and the loss generated at the time when the head traps the leakage flux is reduced.

Also at recording, a part of the soft magnetic layer is saturated by the head and thereby a magnetic circuit reduced in spacing loss is formed.

Thus, by using a magnetoresistive effect-utilizing head, excellent electromagnetic properties can be obtained.

Figure 2:
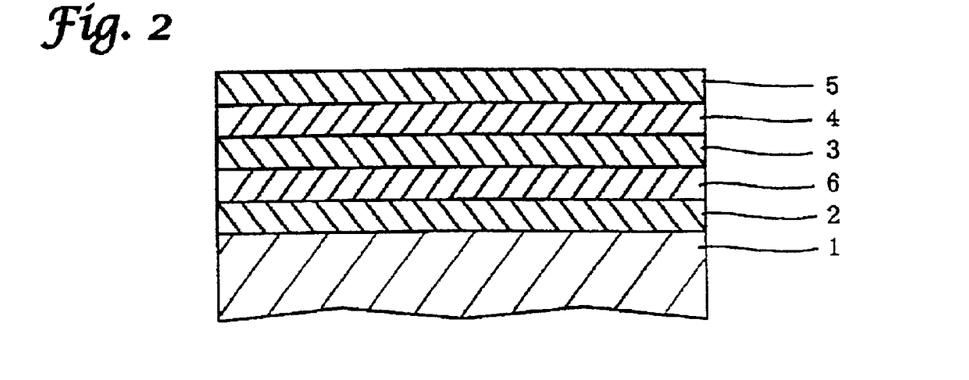
FIG. 2 is a partial cross section showing another practical embodiment of the magnetic recording medium of the present invention.

FIG. 2 is a view showing another practical embodiment of the magnetic recording medium of the present invention. The magnetic recording medium shown here differs from the magnetic recording medium shown in FIG. 1 in that a non-magnetic intermediate layer 6 is provided between the non-magnetic underlayer 2 and the magnetic recording layer 3, namely, immediately under the magnetic recording layer 3.

As the material for the non-magnetic intermediate layer 6, those having a material composition close to the material composition of the magnetic recording layer 3 and allowing the magnetic recording layer 3 having good crystal orientation to epitaxially grow thereon may be used. Furthermore, when the material used has a hcp structure, the effect of improving the crystal orientation of the magnetic recording layer 3 can be advantageously increased.

Specifically, a Co alloy represented by the formula: aCob-CrcPtdTaeZrfCuhB (wherein b is from 25 to 50 at %, c is 10 at % or less, d is 10 at % or less, e is 5 at % or less, f is 5 at % or less, h is 10 at % or less, and a is the balance) is preferably used.

The respective components are more preferably present in such a proportion that b is from 25 to 40 at %, c is 10 at % or less, d is 3 at % or less, e is 2 at % or less, f is 2 at % or less and h is 8 at % or less.

If the Cr content (b) is less than 25 at %, the non-magnetic intermediate layer 6 disadvantageously becomes a magnetic layer.

Furthermore, if the Cr content (b), Pt content (c), Ta content (d), Zr content (e), Cu content (f) and B content (h) each exceeds the above-described upper limit, the composition of the non-magnetic intermediate layer 6 greatly differs from the composition of the magnetic recording layer 3. As a result, the crystal orientation of the magnetic recording layer 3 is deteriorated to reduce the effect of improving coercivity and noise property.

By providing the non-magnetic intermediate layer 6, the initial growth layer which is relatively easy or crystal structure disturbance to occur can be minimized, so that the crystal orientation in the magnetic recording layer 3 can be improved and high coercivity and low noise can be attained.

Figure 3:
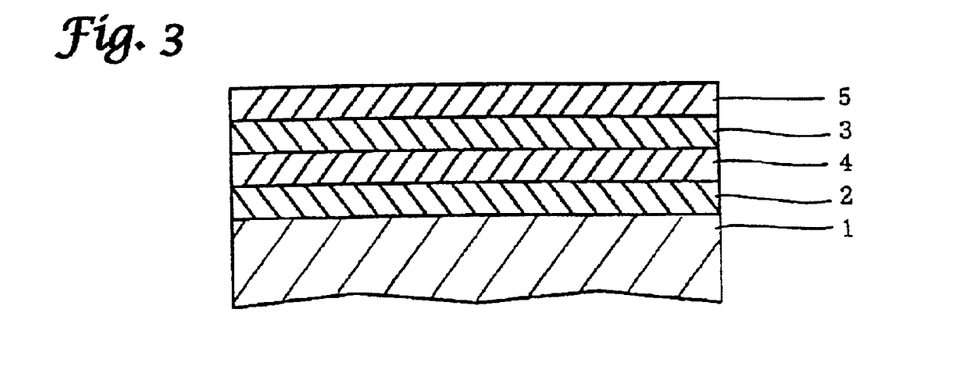
FIG. 3 is a partial cross section showing still another practical embodiment of the magnetic recording medium of the present invention.
Figure 4:
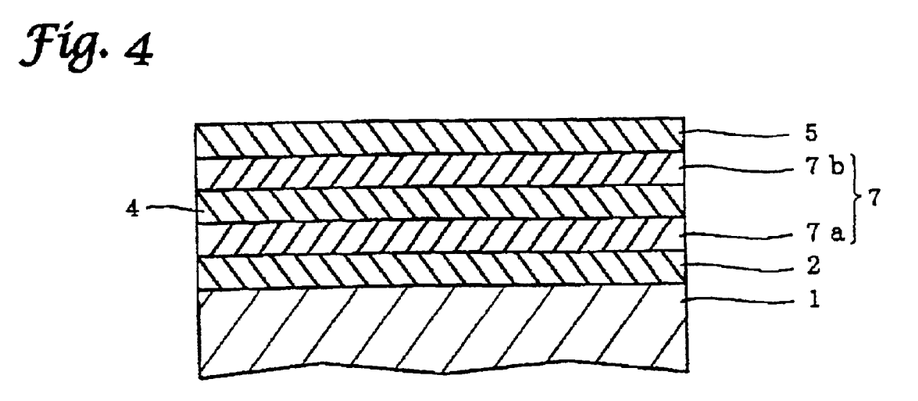
FIG. 4 is a partial cross section showing yet another practical embodiment of the magnetic recording medium of the present invention.

The magnetic recording medium of the present invention may also have a structure shown in FIG. 3 or FIG. 4.

The magnetic recording medium shown in FIG. 3 differs from the magnetic recording medium shown in FIG. 1 in that the soft magnetic layer 4 is provided on the lower surface side of the magnetic recording layer 3.

A non-magnetic intermediate layer 6 may be provided between the magnetic recording layer 3 and the soft magnetic layer 4.

In the magnetic recording medium shown in FIG. 4, the magnetic recording layer shown by numeral 7 comprises of first and second magnetic recording layers 7a and 7b and a soft magnetic layer 4 is provided between these first and second magnetic recording layers 7a and 7b.

A non-magnetic intermediate layer may be provided right under either one or both of the first and second magnetic recording layers 7a and 7b.

EXAMPLES

The action and effect of the present invention are described below by specifically referring to the Examples. Unless otherwise indicated herein, all parts, percents, ratios and the like are by weight.

Test Example 1

A magnetic recording medium having the same structure as shown in FIG. 1 was manufactured as follows.

An aluminum metal substrate (diameter: 95 mm, thickness: 0.8 mm) having formed thereon a NiP plating film (thickness: 10 $\mu$m) was subjected to mechanical texturing to have a surface average roughness Ra of 6 Å. The resulting substrate 1 was set in a chamber of a DC magnetron sputtering device (3010, manufactured by ANERVA).

The chamber was evacuated until the ultimate vacuum reached $2 \times 10^{-7}$ Pa, the non-magnetic substrate 1 was heated to 200° C., and then on the non-magnetic substrate 1, a non-magnetic underlayer 2, a magnetic recording layer 3, a soft magnetic layer 4 were sequentially formed by sputtering.

Thereafter, a carbon protective layer 5 having a thickness of 70 Å was formed by a plasma CVD method using a plasma CVD apparatus (manufactured by ANERVA Corporation) and then a PFPE lubricant was coated on the protective layer 5 using a dipping method to form a lubricating layer (not shown) having a thickness of 15 Å.

Test Examples 2 to 6

Magnetic recording media were produced in the same manner as in Test Example 1 except that the thickness of the soft magnetic layer 4 was changed.

Test Examples 7 to 11

Magnetic recording media were produced in the same manner as in Test Example 1 except that the soft magnetic layer 4 was formed from a material comprising Co (single composition), the thickness of the soft magnetic layer 4 was changed as shown in Table 1, and the thickness of the magnetic recording layer 3 was set such that a constant LF output could be attained.

Test Examples 12 to 16

Magnetic recording media were produced in the same manner as in Test Example 1 except that the soft magnetic layer 4 was formed from a material comprising Ni (single composition) and the thickness of the soft magnetic layer 4 was changed as shown in Table 1.

Test Examples 17 to 22

Magnetic recording media were produced in the same manner as in Test Example 1 except that the non-magnetic underlayer 2 was formed from a material comprising Cr (single composition), the thickness of the soft magnetic layer 4 was changed as shown in Table 1, and the thickness of the magnetic recording layer 3 was set such that a constant LF output could be attained.

Test Examples 23 and 24

Magnetic recording media were produced in the same manner as in Test Example 1 except that the coercivity of the medium was changed by appropriately changing the substrate temperature at the formation of the magnetic recording layer 3 and the thickness of the soft magnetic layer 4 was changed to 20 Å.

Test Examples 25 to 28

Magnetic recording media were produced in the same manner as in Test Example 1 except that the magnetic recording layer 3 was formed from a material comprising a material shown in Table 1 and the thickness of the soft magnetic layer 4 was changed to 20 Å.

Test Examples 29 to 31

Magnetic recording media were produced in the same manner as in Test Example 1 except that a non-magnetic intermediate layer 6 was provided immediately under the magnetic recording layer 3 as shown in FIG. 2 and the thickness of the soft magnetic layer 4 was changed to 20 Å.

Test Examples 32 to 35

Magnetic recording media were produced in the same manner as in Test Example 1 except that the non-magnetic underlayer 2 was formed from a material comprising a material shown in Table 1 and the thickness of the soft magnetic layer 4 was changed to 20 Å.

Test Example 36

A magnetic recording medium was produced in the same manner as in Test Example 1 except the description in the Example of JP-A-7-169037 was followed, that is, an underlayer (thickness: 300 Å) comprising Cr was provided on a substrate, a magnetic recording layer (thickness: 500 Å) comprising Co-13 at % Cr-3 at % Ta ($Co_{13}Cr_3Ta$) was provided on the underlayer, and a soft magnetic layer (thickness: 50 Å) comprising $Ni_{19}Fe$ was provided on the magnetic recording layer.

Test Example 37

A magnetic recording medium was produced in the same manner as in Test Example 1 except the description in the Example of JP-A-10-116412 was followed, that is, an underlayer (thickness: 30 Å) comprising Cr was provided on a substrate, a magnetic recording layer (thickness: 300 Å) comprising $Co_{18}CrPt_3Ta$ was provided on the underlayer, and a soft magnetic layer (thickness: 130 Å) comprising $Fe_2Al_5Si$ was provided on the magnetic recording layer.

The magnetostatic properties of the magnetic recording media of Test Examples 1 to 37 were evaluated using a vibrating sample magnetometry (VSM).

Furthermore, the electromagnetic properties of these magnetic recording media were evaluated using three kinds of heads, namely, an inductive-GMR composite magnetic recording head employing a giant magnetoresistive (GMR) device in the producing moiety, an inductive-MR composite magnetic recording head employing a magnetoresistive (MR) device, and an inductive-DSMR composite magnetic recording head employing a dual stripe MR (DSMR) element having two MR devices disposed perpendicularly to the track direction.

Also, the electromagnetic properties of these magnetic recording media were evaluated using a read-write analyzer RWA1632 and a spin stand S1701MP, manufactured by Guzik. The LFTAA measurement was performed at a linear recording density of 42 kFCI, the OW measurement was performed at two linear recording densities of 250 kFCI and 42 kFCI, the SNR measurement was performed using a Base-Peak value of LFTAA output as the signal, and the noise measurement was performed using a linear recording density of 250 kFCI. The off-track property was evaluated using a value obtained by determining the error rate of PR4ML to respective positions in the track width direction to obtain a so-called bath tab curve and dividing the width at an error rate of $10^{-7}$ into two. In the table below, OTC means this value.

The corrosion resistance was evaluated using the extracted Ni amount as an index, namely a value obtained by sealing the outer edge part and the inner edge part of each magnetic recording medium prepared above with paraffin, immersing the recording medium in pure water at 80° C. for 30 minutes and determining the amount of Ni dissolved out into pure water per the unit area of the substrate. The results of respective evaluation tests are shown in Table 1.

The maximum permeability was found that $Ni_{19}Fe$: 300,000, Co: 5,000, Ni: 10,000, and $Ni_2Al_5Si$: 100.

Test Examples 40 to 60

Test Examples 40 to 60 are drawn to magnetic recording media produced in a manner similar to that described in relation to Test Example 1, except that a non-magnetic underlayer, a non-magnetic intermediate layer, a magnetic recording layer, and a soft magnetic layer, which are shown in Table 2, were formed. The thickness of the magnetic layer was regulated so as to attain an MrT of 0.3 memu/cm².

GMR heads, simply indicated as GMR2 in Table 2, which are capable of attaining a recording density of 15 Gbpsi were used in the evaluation of electromagnetic conversion properties of magnetic recording media of Test Examples 40 to 60. In the evaluation, 83 kFCI was employed for measurement of LFTAA, and 500 kFCI and 83 kFC1 were employed for measurement of OW. Noise was measured in a manner similar to that described in relation to Test Example 1, except that a 500 kFCI pattern was used.

TABLE 1

| | Underlayer Composition | Non-magnetic Intermediate Layer Composition | Soft Magnetic Layer Thickness (Å) | Soft Magnetic Layer Composition | Magnetic Recording Layer Composition | Hc (Oe) | Reproducing Device | LFTAA (mAp-p) | OW (dB) | PW50 (nS) | SNR (dB) | OTC (u") | Extracted Ni Amount (ng/cm²) |
|---|---|---|---|---|---|---|---|---|---|---|---|---|---|
| Test Example 1 | Cr25W | none | 5 | Ni19Fe | Co18Cr8Pt3Ta1Cu | 3320 | MR | 0.905 | 32.9 | 18.9 | 24.4 | 8.1 | N.D. |
| Test Example 2 | Cr25W | none | 20 | Ni19Fe | Co18Cr8Pt3Ta1Cu | 2880 | MR | 1.015 | 38.5 | 19.0 | 23.8 | 9.0 | N.D. |
| Test Example 3 | Cr25W | none | 30 | Ni19Fe | Co18Cr8Pt3Ta1Cu | 2650 | MR | 1.088 | 39.9 | 19.7 | 22.9 | 8.5 | N.D. |
| Test Example 4 | Cr25W | none | 40 | Ni19Fe | Co18Cr8Pt3Ta1Cu | 2628 | MR | 1.114 | 40.3 | 19.7 | 21.5 | 8.0 | N.D. |
| Test Example 5 | Cr25W | none | 60 | Ni19Fe | Co18Cr8Pt3Ta1Cu | 2535 | MR | 1.128 | 40.4 | 21.0 | 16.6 | 3.5 | N.D. |
| Test Example 6 | Cr25W | none | none | none | Co18Cr8Pt3Ta1Cu | 3320 | MR | 0.927 | 26.9 | 19.7 | 23.9 | 5.7 | 0.1 |
| Test Example 7 | Cr25W | none | 5 | Co | Co18Cr8Pt3Ta1Cu | 3578 | DSMR | 1.083 | 35.2 | 11.7 | 19.4 | 8.7 | N.D. |
| Test Example 8 | Cr25W | none | 20 | Co | Co18Cr8Pt3Ta1Cu | 3638 | DSMR | 1.048 | 36.3 | 11.5 | 19.8 | 8.6 | N.D. |
| Test Example 9 | Cr25W | none | 40 | Co | Co18Cr8Pt3Ta1Cu | 3632 | DSMR | 0.979 | 36.7 | 11.4 | 19.3 | 8.6 | N.D. |
| Test Example 10 | Cr25W | none | 60 | Co | Co18Cr8Pt3Ta1Cu | 3640 | DSMR | 1.088 | 37.8 | 12.1 | 13.2 | 0.0 | N.D. |
| Test Example 11 | Cr25W | none | none | none | Co18Cr8Pt3Ta1Cu | 3538 | DSMR | 1.099 | 34.0 | 11.8 | 18.6 | 3.9 | 0.12 |
| Test Example 12 | Cr25W | none | 5 | Ni | Co18Cr8Pt3Ta1Cu | 3545 | MR | 0.792 | 23.9 | 19.5 | 22.9 | 5.9 | N.D. |
| Test Example 13 | Cr25W | none | 20 | Ni | Co18Cr8Pt3Ta1Cu | 3380 | MR | 0.830 | 27.7 | 19.0 | 23.3 | 8.0 | N.D. |
| Test Example 14 | Cr25W | none | 30 | Ni | Co18Cr8Pt3Ta1Cu | 2873 | MR | 0.899 | 37.2 | 18.8 | 23.6 | 8.9 | N.D. |
| Test Example 15 | Cr25W | none | 40 | Ni | Co18Cr8Pt3Ta1Cu | 2598 | MR | 0.958 | 39.6 | 19.2 | 21.1 | 6.8 | N.D. |
| Test Example 16 | Cr25W | none | 60 | Ni | Co18Cr8Pt3Ta1Cu | 2548 | MR | 1.088 | 40.1 | 20.8 | 15.5 | 0.0 | N.D. |
| Test Example 17 | Cr | none | 5 | Ni19Fe | Co20Cr9Pt1Ta2Cu | 3544 | GMR | 0.947 | 32.2 | 14.1 | 20.8 | 8.8 | N.D. |
| Test Example 18 | Cr | none | 15 | Ni19Fe | Co20Cr9Pt1Ta2Cu | 3532 | GMR | 0.948 | 32.2 | 14.1 | 20.8 | 8.9 | N.D. |
| Test Example 19 | Cr | none | 20 | Ni19Fe | Co20Cr9Pt1Ta2Cu | 3451 | GMR | 0.955 | 33.8 | 14.1 | 19.0 | 8.2 | N.D. |
| Test Example 20 | Cr | none | 40 | Ni19Fe | Co20Cr9Pt1Ta2Cu | 3385 | GMR | 0.893 | 35.9 | 13.8 | 19.7 | 5.7 | N.D. |
| Test Example 21 | Cr | none | 60 | Ni19Fe | Co20Cr9Pt1Ta2Cu | 2708 | GMR | 0.940 | 35.3 | 15.0 | 13.8 | 0.0 | N.D. |
| Test Example 22 | Cr | none | none | none | Co20Cr9Pt1Ta2Cu | 3453 | GMR | 0.910 | 31.0 | 14.1 | 21.2 | 5.5 | 0.1 |
| Test Example 23 | Cr25W | none | 20 | Ni19Fe | Co18Cr8Pt3Ta1Cu | 2135 | MR | 1.054 | 39.4 | 21.5 | 10.3 | 0.0 | N.D. |

TABLE 1-continued

| | | Underlayer Composition | Non-magnetic Intermediate Layer Composition | Soft Magnetic Layer Thickness (Å) | Soft Magnetic Layer Composition | Magnetic Recording Layer Composition | Hc (Oe) | Reproducing Device | LFTAA (mAp-p) | OW (dB) | PW50 (nS) | SNR (dB) | OTC (u") | Extracted Ni Amount (ng/cm$^2$) |
|---|---|---|---|---|---|---|---|---|---|---|---|---|---|---|
| Test Example | 24 | Cr25W | none | 20 | Ni19Fe | Co18Cr8Pt3Ta1Cu | 2368 | MR | 0.923 | 38.2 | 20.9 | 17.0 | 2.3 | N.D. |
| Test Example | 25 | Cr25W | none | 20 | Ni19Fe | Co18Cr8Pt3Ta1Cu3Ni | 3545 | MR | 0.998 | 37.6 | 19.8 | 21.2 | 8.5 | N.D. |
| Test Example | 26 | Cr25W | none | 20 | Ni19Fe | Co18Cr8Pt3Ta1Cu5Ni | 3492 | MR | 0.987 | 36.7 | 18.3 | 20.3 | 8.7 | N.D. |
| Test Example | 27 | Cr25W | none | 20 | Ni19Fe | Co18Cr8Pt3Ta1Cu7Ni | 3478 | MR | 0.945 | 39.5 | 19.0 | 21.7 | 8.8 | N.D. |
| Test Example | 28 | Cr25W | none | 20 | Ni19Fe | Co18Cr8Pt3Ta | 3380 | MR | 0.988 | 38.5 | 19.2 | 19.8 | 8.0 | N.D. |
| Test Example | 29 | Cr25W | Co40Cr | 20 | Ni19Fe | Co18Cr8Pt3Ta1Cu | 3612 | MR | 0.956 | 37.5 | 18.7 | 21.5 | 8.4 | N.D. |
| Test Example | 30 | Cr25W | Co25Cr8Pt3Ta2B | 20 | Ni19Fe | Co18Cr8Pt3Ta1Cu | 3584 | MR | 0.978 | 37.9 | 17.8 | 22.0 | 8.1 | N.D. |
| Test Example | 31 | Cr25W | Co25Cr8Pt3Ta | 20 | Ni19Fe | Co18Cr8Pt3Ta1Cu | 3585 | MR | 0.935 | 37.2 | 18.7 | 21.5 | 8.5 | N.D. |
| Test Example | 32 | Cr15W | none | 20 | Ni19Fe | Co18Cr8Pt3Ta1Cu | 3832 | MR | 0.985 | 35.7 | 19.3 | 21.7 | 8.7 | N.D. |
| Test Example | 33 | Cr25Ti | none | 20 | Ni19Fe | Co18Cr8Pt3Ta1Cu | 3571 | MR | 0.996 | 37.0 | 19.0 | 21.3 | 8.4 | N.D. |
| Test Example | 34 | Cr15V | none | 20 | Ni19Fe | Co18Cr8Pt3Ta1Cu | 3589 | MR | 1.012 | 38.0 | 19.5 | 20.8 | 8.2 | N.D. |
| Test Example | 35 | Cr15Mo | none | 20 | Ni19Fe | Co18Cr8Pt3Ta1Cu | 3488 | MR | 0.914 | 37.9 | 19.4 | 19.9 | 8.0 | N.D. |
| Test Example | 36 | Cr | none | 50 | Ni19Fe | Co13Cr3Ta | 2180 | MR | 2.058 | 24.5 | 22.5 | 8.8 | 0 | |
| Test Example | 37 | Cr | none | 130 | Ni2AiSSi | Co18Cr8Pt3Ta | 1650 | MR | 0.850 | 25.5 | 21.2 | 7.3 | 0 | |

TABLE 2

| | Under-layer Composition | Non-magnetic Intermediate Layer Composition | Magnetic Recording Layer Composition | Soft Magnetic Layer (Å) | Soft Magnetic Layer Composition | Hc (Oe) | Reproducing Device |
|---|---|---|---|---|---|---|---|
| Test Example 40 | Cr25W | Co35Cr | Co18Cr12Pt | 10 | Ni19Fe | 3230 | GMR2 |
| Test Example 41 | Cr25W | Co35Cr | Co18Cr12Pt8B | 10 | Ni19Fe | 3599 | GMR2 |
| Test Example 42 | Cr25W | Co35Cr | Co18Cr12Pt10B | 10 | Ni19Fe | 3739 | GMR2 |
| Test Example 43 | Cr25W | Co35Cr | Co18Cr12Pt12B | 10 | Ni19Fe | 3824 | GMR2 |
| Test Example 44 | Cr25W | Co35Cr | Co18Cr12Pt16B | 10 | Ni19Fe | 3766 | GMR2 |
| Test Example 45 | Cr25W | Co35Cr | Co18Cr12Pt22B | 10 | Ni19Fe | 3246 | GMR2 |
| Test Example 46 | Cr25W | Co35Cr | Co18Cr10Pt12B | 10 | Ni19Fe | 3824 | GMR2 |
| Test Example 47 | Cr25W | Co35Cr | Co18Cr14Pt12B | 10 | Ni19Fe | 4029 | GMR2 |
| Test Example 48 | Cr25W | Co35Cr | Co18Cr16Pt12B | 10 | Ni19Fe | 4224 | GMR2 |
| Test Example 49 | Cr25W | Co35Cr | Co18Cr18Pt12B | 10 | Ni19Fe | 4487 | GMR2 |
| Test Example 50 | Cr25W | Co35Cr | Co18Cr22Pt12B | 10 | Ni19Fe | 4890 | GMR2 |
| Test Example 51 | Cr25W | Co35Cr | Co18Cr12Pt12B2Ru | 10 | Ni19Fe | 3874 | GMR2 |
| Test Example 52 | Cr25W | Co35Cr | Co18Cr12Pt12B4Ru | 10 | Ni19Fe | 3857 | GMR2 |
| Test Example 53 | Cr25W | Co35Cr | Co18Cr12Pt12B6Ru | 10 | Ni19Fe | 3867 | GMR2 |
| Test Example 54 | Cr25W | Co35Cr | Co18Cr12Pt12B10Ru | 10 | Ni19Fe | 3847 | GMR2 |
| Test Example 55 | Cr25W | Co35Cr | Co18Cr12Pt12B22Ru | 10 | Ni19Fe | 2548 | GMR2 |
| Test Example 56 | Cr25W | Co35Cr | Co27Cr8Pt4B/Co14Cr14Pt8B | 10 | Ni19Fe | 4120 | GMR2 |
| Test Example 57 | Cr25W | Co35Cr | Co25Cr8Pt4B/Co14Cr14Pt8B | 10 | Ni19Fe | 4254 | GMR2 |
| Test Example 58 | Cr25W | Co35Cr | Co27Cr8Pt4B/Co12Cr14Pt8B | 10 | Ni19Fe | 4104 | GMR2 |
| Test Example 59 | Cr25W | Co35Cr | Co24Cr8Pt4B/Co12Cr14Pt8B | 10 | Ni19Fe | 4288 | GMR2 |
| Test Example 60 | Cr25W | Co35Cr | Co15Cr8Pt4B/Co13Cr14Pt8B | 10 | Ni19Fe | 4430 | GMR2 |

| | LFTAA (mAp-p) | OW (dB) | PW50 (nS) | SNR (dB) | OTC (n") | Extracted Ni Amount (ng/cm2) |
|---|---|---|---|---|---|---|
| Test Example 40 | 1.141 | 45.4 | 8.3 | 15.5 | 1.5 | N.D. |
| Test Example 41 | 1.148 | 45.3 | 8.1 | 16.3 | 3.4 | N.D. |
| Test Example 42 | 1.144 | 44.0 | 8.1 | 16.6 | 3.3 | N.D. |
| Test Example 43 | 1.147 | 44.1 | 8.1 | 16.7 | 3.1 | N.D. |
| Test Example 44 | 1.151 | 43.8 | 8.1 | 16.1 | 2.6 | N.D. |
| Test Example 45 | 1.138 | 42.5 | 9.9 | 13.4 | 0.0 | N.D. |
| Test Example 46 | 1.147 | 44.1 | 8.1 | 16.7 | 3.1 | N.D. |
| Test Example 47 | 1.142 | 43.3 | 8.0 | 16.9 | 3.1 | N.D. |
| Test Example 48 | 1.151 | 40.3 | 8.0 | 17.0 | 3.0 | N.D. |
| Test Example 49 | 1.129 | 36.6 | 8.3 | 15.8 | 2.6 | N.D. |
| Test Example 50 | 1.087 | 28.9 | 9.8 | 13.7 | 0.0 | N.D. |
| Test Example 51 | 1.151 | 43.2 | 8.0 | 17.2 | 3.1 | N.D. |
| Test Example 52 | 1.158 | 41.2 | 8.0 | 17.1 | 3.0 | N.D. |
| Test Example 53 | 1.162 | 42.6 | 8.2 | 16.4 | 3.3 | N.D. |
| Test Example 54 | 1.147 | 44.5 | 8.3 | 15.7 | 2.8 | N.D. |
| Test Example 55 | 1.135 | 41.4 | 10.9 | 11.2 | 0.0 | N.D. |
| Test Example 56 | 1.202 | 41.9 | 7.8 | 18.1 | 3.2 | N.D. |
| Test Example 57 | 1.291 | 40.8 | 7.7 | 18.0 | 3.1 | N.D. |
| Test Example 58 | 1.241 | 43.0 | 7.8 | 18.3 | 3.3 | N.D. |
| Test Example 59 | 1.188 | 41.1 | 7.6 | 17.9 | 3.0 | N.D. |
| Test Example 60 | 1.254 | 38.5 | 9.8 | 9.4 | 0.0 | N.D. |

As is apparent from the results in Table 1, PW50 was very small when the thickness of the soft magnetic layer 4 was from 5 to 50 Å irrespective of the head used.

With respect to OW, as the OW was lower when soft magnetic layer 4 was not provided, a more outstanding improvement of OW was attained by providing a soft magnetic layer 4, and this effect was saturated in the vicinity of the thickness of the soft magnetic layer 4 being from 40 to 50 Å.

SNR started to decrease in the vicinity of the thickness of the soft magnetic layer 4 being in excess of 40 Å.

OTC was abruptly deteriorated when the thickness of the soft magnetic layer 4 departed from the range of from 5 to 50 Å.

From these results, it is seen that when the thickness of the soft magnetic layer is from 5 to 50 Å, good properties are obtained with respect to SNR, PW50, OW and OTC and the electromagnetic properties are improved.

Furthermore, out of the three kinds of heads making use of magnetoresistive effect, whichever is used in reproduction, an inductive-MR composite magnetic recording head, an inductive-GMR composite magnetic recording head or an inductive-DSMR composite magnetic recording head, the electromagnetic properties are improved with the thickness of the soft magnetic layer being from 5 to 50 Å.

As seen from the comparison between Test Examples 1 to 6 and Test Examples 23 and 24, if the coercivity (Hc) is less than 2,500 Oe, OW may be good but SNR is low.

As seen from the comparison between Test Example 2 and Test Examples 25 to 28, even if the material composition of the magnetic recording layer 3 is changed within the range specified, the electromagnetic properties are not deteriorated but remain good.

As seen from the Comparison between Test Example 2 and Test Examples 29 to 31, even if a non-magnetic intermediate layer 6 is provided, the electromagnetic properties are not deteriorated but remain good.

As seen from the Comparison between Test Example 2 and Test Examples 32 to 35, even if the material composition of the non-magnetic underlayer 2 is changed within the range specified, the electromagnetic properties are not deteriorated but remain good.

In the case of the magnetic recording medium of Test Example 36 manufactured following the description of JP-A-7-169037, it is seen that all electromagnetic properties exclusive of LFTAA are extremely inferior as compared with Test Examples 1 to 5, 12 to 16 and 25 to 35.

In this magnetic recording medium, it is considered that noise property and SNR are bad because the Cr content in the magnetic recording layer is low and the magnetic coupling between magnetic particles in the magnetic recording layer is strong. Furthermore, the PW50 and OW are bad because the thickness of the magnetic recording layer is large.

In the case of the magnetic recording medium of Test Example 37 manufactured following the description of JP-A-10-116412, it is seen that particularly PW50 and SNR are extremely poor as compared with Test Examples 1 to 5, 12 to 16 and 25 to 35.

In this magnetic recording medium, it is considered, high coercivity cannot be obtained because of small thickness of the underlayer, PW50 is bad and SNR is also bad due to small maximum permeability of the soft magnetic layer.

With respect to the corrosion resistance, Ni dissolved out in the case of magnetic recording media of Test Examples 6, 11 and 22 where a soft magnetic layer 4 was not provided, whereas in the magnetic recording media where a soft magnetic layer 4 was provided, Ni was not dissolved out at all, thereby revealing by far superior corrosion resistance.

In Test Examples 56 to 60, the magnetic recording layer are formed of two sublayers, each having the same thickness (i.e., thickness ratio was 50:50). For example, in Test Example 56, Co27Cr8Pt4B is placed on the substrate side, and Co14Cr14Pt8B is placed on the protective layer side. As a result, the composition of the magnetic recording layer as a whole is Co20.5Cr11Pt6B. Test Examples 56 to 59, in which the Cr content is 16 at % to 25 at %, exhibit better SNR characteristics than does Test Example 60, in which the overall Cr content of the magnetic recording layer is 14 at %.

The results of measurement performed by employing a write head (indicated as GMR2) of Bs 1.8T are shown for Test Examples 46 to 50. Test Example 50, in which the Pt content is 22 at %, exceeding 20 at %, exhibits lowered OW, with an attendant effect of lowered SNR.

Test Examples 41 to 44, in which the B content is 1 to 20 at %, exhibit better electromagnetic conversion properties than does Test Example 45, in which B content exceeds 20 at %, or Test Example 40, in which B is not contained.

Test Examples 51 to 54, in which the Ru content is 20 at %, exhibit better electromagnetic conversion properties than does Test Example 55, in which Ru content is 22 at %.

As described in the foregoing, the magnetic recording medium of the present invention can be improved in SNR and PW50 without causing any deterioration in the OW property and off-track property, moreover, is favored with a sufficiently high corrosion resistance.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic substrate having thereon a non-magnetic underlayer, a magnetic recording layer comprising a Co alloy represented by the formula: $aCo_bCr_cPt_dTa_eZr_fCu_hB_jRu$, wherein b is from 8 to 26 at %, c is 20 at % or less, d is 7 at % or less, e is 4 at % or less, f is 3 at % or less, h is from 1 to 20 at %, j is 20 at % or less, and a is the balance, a soft magnetic layer and a protective layer, wherein the coercivity is 2,500 Oe or more, and the thickness of the soft magnetic layer is from 5 to 50 Å.

2. A magnetic recording medium as claimed in claim 1, wherein the magnetic recording layer comprises two or more magnetic layers and an average composition formula of the magnetic layer is represented by the formula: $aCo_bCr_cPt_dTa_eZr_fCu_hB_jRu$, wherein b is from 8 to 26 at %, c is 20 at % or less, d is 7 at % or less, e is 4 at % or less, f is 3 at % or less, h is from 1 to 20 at %, j is 20 at % or less, and a is the balance.

3. The magnetic recording medium as claimed in any one of claim 1 or 2, wherein an amount of extracted Ni from the substrate is 0.08 ng/cm$^2$ or less based on unit area of the substrate.

4. The magnetic recording medium as claimed in any one of claim 1 or 2, wherein the soft magnetic layer has a maximum magnetic permeability of from 1,000 to 1,000,000.

5. The magnetic recording medium as claimed in claim 1 or 2, wherein a non-magnetic intermediate layer comprising a Co alloy represented by the formula: $aCo_bCr_cPt_dTa_eZr_fCu_hB$, wherein b is from 25 to 50 at %, c is 10 at % or less, d is 10 at % or less, e is 5 at % or less, f is 5 at % or less, h is 10 at % or less, and a is the balance, is present immediately under the magnetic recording layer.

6. The magnetic recording medium as claimed in any one of claim 1 or 2, wherein a non-magnetic underlayer having a thickness of 100 to 300 Å comprises a layer of a material containing NiAl.

7. The magnetic recording medium as claimed in any one of claim 1 or 2, wherein a non-magnetic underlayer having a thickness of 100 to 300 Å comprises a layer of a material containing Cr and one or more elements selected from the group consisting of Mo, W, V, Ti and Nb.

8. The magnetic recording medium as claimed as claim 5, wherein a non-magnetic underlayer having a thickness of 100 to 300 Å comprises a layer of a material containing NiAl.

9. The magnetic recording medium as claimed as claim 5, wherein a non-magnetic underlayer having a thickness of 100 to 300 Å comprises a layer of a material containing Cr and one or more elements selected from the group consisting of Mo, W, V, Ti and Nb.

10. A head employing a reproducing device making use of a magnetoresistive effect in combination with the magnetic recording medium as claimed in any one of claims 1 or 2.

11. A head employing a reproducing device making use of a magnetoresistive effect in combination with the magnetic recording medium as claimed in claim 5.

* * * * *